(12) United States Patent
Bartz et al.

(10) Patent No.: US 6,579,581 B2
(45) Date of Patent: Jun. 17, 2003

(54) POLYMER BLEND HAVING GOOD LOW-TEMPERATURE IMPACT STRENGTH

(75) Inventors: Wilfried Bartz, Marl (DE);
Franz-Erich Baumann, Duelmen (DE);
Guido Schmitz, Duelmen (DE); Georg Oenbrink, Duelmen (DE); Harald Haeger, Marl (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/886,217

(22) Filed: Jun. 22, 2001

(65) Prior Publication Data

US 2002/0019477 A1 Feb. 14, 2002

(30) Foreign Application Priority Data

Jun. 23, 2000 (DE) .......................................... 100 30 716

(51) Int. Cl.⁷ ............................ C08L 77/00; B32B 1/08; B32B 27/08
(52) U.S. Cl. .................. 428/34.7; 428/35.7; 428/475.5; 525/66; 525/179; 524/514
(58) Field of Search .................. 525/66, 179; 428/35.7, 428/34.7, 475.5; 524/514

(56) References Cited

U.S. PATENT DOCUMENTS

| | | | |
|---|---|---|---|
| 5,043,385 A | * | 8/1991 | Yasue et al. ................... 525/66 |
| 5,221,712 A | * | 6/1993 | Ohmae et al. ................. 525/66 |
| 5,317,059 A | | 5/1994 | Chundury et al. ............. 525/66 |
| 5,708,088 A | | 1/1998 | Hert et al. .................... 525/179 |
| 6,177,162 B1 | | 1/2001 | Siour et al. ............... 428/36.91 |

FOREIGN PATENT DOCUMENTS

| | | |
|---|---|---|
| EP | 0 564 338 | 10/1993 |
| EP | 0 731 308 | 9/1996 |
| JP | 57-12055 | * 1/1982 |
| JP | 59-164359 | * 9/1984 |
| WO | WO 95/22579 | 8/1995 |
| WO | WO 97/35910 | 10/1997 |
| WO | WO 00/22031 | 4/2000 |

* cited by examiner

*Primary Examiner*—Ana Woodward
(74) *Attorney, Agent, or Firm*—Oblon, Spivak, McClelland, Maier & Neustadt P.C.

(57) ABSTRACT

A molding which comprises the following components:
(I) from 60 to 96.5 parts by weight of polyamide;
(II) from 3 to 39.5 parts by weight of an impact-modifying component which contains anhydride groups,
(III) from 0.5 to 20 parts by weight of a copolymer which contains units of the monomers:
(a) α-olefin,
(b) acrylic compound, and also
(c) olefinically unsaturated epoxide, carboxylic anhydride, carboximide, oxazoline or oxazinone, where the total of the parts by weight of components I, II, and III is 100, and where moreover the polyamide has an excess of amino end groups, has improved low-temperature impact strength, even if the molding composition also comprises a plasticizer.

48 Claims, No Drawings

US 6,579,581 B2

POLYMER BLEND HAVING GOOD LOW-TEMPERATURE IMPACT STRENGTH

CROSS REFERENCES TO RELATED APPLICATIONS

This application claims priority to German Patent Application No. 10030716.7, filed on Jun. 23, 2000, and which is incorporated herein by reference in its entirety.

BACKGROUND OF THE INVENTION

1. Field of the Invention

The present invention relates to a material having good low-temperature impact strength and comprising, besides polyamide (PA) as matrix polymer, at least two other polymers which act synergistically to improve the impact strength of the material. The present invention further relates to moldings made from this material.

2. Discussion of the Background

Engineering components such as those used in the automotive industry sector, for example fuel lines which are tubes having one or more layers, nowadays have to fulfill very strict requirements with respect to low-temperature impact strength. To this end, tests are carried out using a variety of methods at a test temperature of −40° C., for example.

It is known that when plasticizers are added to the polyamides frequently used for engineering components of this type, e.g. nylon-4,6; nylon-6,6; nylon-4,12; nylon-6,12; nylon-6; nylon-11; or nylon-12, the materials have poor low-temperature impact strength and it is therefore essential that these materials are modified appropriately.

WO 95/22579 describes the impact-modification of polyamides using two impact modifiers, one modifier used being a modified EPM rubber or a modified EPDM rubber, while the other modifier used is a terpolymer made from ethylene and from an acrylic ester and glycidyl (meth)acrylate. This publication says nothing about the amino end group content of the polyamide. This is not surprising, since even if there is a considerable deficit of amino end groups, the bonding achieved between maleic-anhydride-functionalized EPM rubber or maleic-anhydride-functionalized EPDM rubber and polyamide is normally good.

The use of similar molding compositions as materials for layers in tubes having two or more layers has been described in EP-A-0 731 308, where again nothing is said about the amino end group content of the polyamide.

SUMMARY OF THE INVENTION

Accordingly, it is one object of the present invention to provide molding compositions and, respectively, moldings with particularly high low-temperature impact strength.

It is another object of the present invention to provide molding compositions and, respectively, moldings with good low-temperature impact strength but with the lowest possible content of impact modifiers, so that there is the smallest possible effect on other important properties.

It is another object of the present invention to provide a means of counteracting the effect of the plasticizer, which reduces low-temperature impact strength in plasticized polyamide molding compositions.

These and other objects, which will become apparent during the following detailed description, have been achieved by means of a molding composition which comprises the following components:

(I) from 60 to 96.5 parts by weight of polyamide;
(II) from 3 to 39.5 parts by weight of an impact-modifying component which comprises anhydride groups, where the impact-modifying component is selected from the group consisting of ethylene/α-olefin copolymers and styrene-ethylene/butylene block copolymers; and
(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms,
(b) from 5 to 79.5% by weight, based on the total weight of (a), (b), and (c), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol, said esters optionally bearing a free hydroxyl or epoxide function;
(iii) acrylonitrile and methacrylonitrile; and
(iv) acrylamides and methacrylamides; and
(c) from 0.5 to 50% by weight, based on the total weight of (a), (b), and (c), of an olefinically unsaturated epoxide, carboxylic anhydride, carboximide, oxazoline or oxazinone, wherein the total of the parts by weight of components I, II, and III is 100, and wherein the polyamide has more amino end groups than carboxyl end groups.

DETAILED DESCRIPTION OF THE PREFERRED EMBODIMENTS

Thus, in a first embodiment, the present invention provides molding compositions which comprise:

(I) from 60 to 96.5 parts by weight of polyamide;
(II) from 3 to 39.5 parts by weight of an impact-modifying component which comprises anhydride groups, where the impact-modifying component is selected from the group consisting of ethylene/α-olefin copolymers and styrene-ethylene/butylene block copolymers; and
(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms,
(b) from 5 to 79.5% by weight, based on the total weight of (a), (b), and (c), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol, said esters optionally bearing a free hydroxyl or epoxide function;
(iii) acrylonitrile and methacrylonitrile; and
(iv) acrylamides and methacrylamides; and
(c) from 0.5 to 50% by weight, based on the total weight of (a), (b), and (c), of an olefinically unsaturated epoxide, carboxylic anhydride, carboximide, oxazoline or oxazinone, wherein the total of the parts by weight of components I, II, and III is 100, and wherein the polyamide has more amino end groups than carboxyl end groups.

In preferred embodiments, the present molding composition comprises:

(I) from 65 to 90 parts by weight, particularly preferably from 70 to 85 parts by weight, of the polyamide;

(II) from 5 to 30 parts by weight, particularly preferably from 6 to 25 parts by weight, and more particularly preferably from 7 to 20 parts by weight, of the impact-modifying component; and (III) from 0.6 to 15 parts by weight, and particularly preferably from 0.7 to 10 parts by weight, of the copolymer, which preferably comprises monomer units of the following monomers:
  (a) from 30 to 80% by weight, based on the total weight of (a), (b), and (c), of α-olefin(s);
  (b) from 7 to 70% by weight, particularly preferably from 10 to 60% by weight, based on the total weight of (a), (b), and (c), of the acrylic compound(s); and
  (c) from 1 to 40% by weight, particularly preferably from 5 to 30% by weight, based on the total weight of (a), (b), and (c), of the olefinically unsaturated epoxide, carboxylic anhydride, carboximide, oxazoline, or oxazinone.

Polyamides which may be used are mainly aliphatic homo- or copolycondensates, such as nylon-4,6; nylon-6,6; nylon-6,8; nylon-6,10; nylon-6,12; nylon-4,10; nylon-8,10; nylon-10,10; nylon-4,12; nylon-10,12; nylon-12,12; nylon-6; nylon-7; nylon-8; nylon-9; nylon-10; nylon-11; and nylon-12. (The naming of the polyamides corresponds to an international standard according to which the first numeral (s) give(s) the number of carbon atoms in the starting diamine, and the final numeral(s) give(s) the number of carbon atoms in the dicarboxylic acid. If only one numeral is mentioned, that means that the starting material was an α,ω-aminocarboxylic acid or the lactam derived therefrom. Reference may also be made to H. Domininghaus, *Die Kunststoffe und ihre Eigenschaften* [*Plastics and their properties*], pp. 272 et seq. VDI-Verlag, 1976, which is incorporated herein by reference).

If use is made of copolyamides, these may contain adipic acid, sebacic acid, suberic acid, isophthalic acid, terephthalic acid, naphthalene-2,6-dicarboxylic acid, for example, as coacid and, respectively, bis(4-aminocyclohexyl)methane, trimethylhexamethylenediamine, hexamethylenediamine or the like as codiamine. Lactams, such as caprolactam or laurolactam and, respectively, aminocarboxylic acids, such as ω-aminoundecanoic acid, may likewise be incorporated as cocomponent.

The preparation of these polyamides is known (see, e.g., D. B. Jacobs, J. Zimmermann, *Polymerization Processes*, pp. 424–467, Interscience Publishers, New York, 1977; and DE-B 21 52 194, which are incorporated herein by reference).

Other suitable polyamides are mixed aliphatic/aromatic polycondensates, as described in U.S. Pat. Nos. 2,071,250; 2,071,251; 2,130,523; 2,130,948; 2,241,322; 2,312,966; 2,512,606; and 3,393,210, and also in Kirk-Othmer, Encyclopedia of Chemical Technology, 3rd edn., Vol. 18, pp. 328 et seq. and 435 et seq., Wiley & Sons, 1982, which are incorporated herein by reference.

Suitable ethylene/α-olefin copolymers of component (II) include:
  ethylene/$C_3$–$C_{12}$-α-olefin copolymers comprising the following monomer units: from 20 to 96% by weight, preferably from 25 to 85% by weight, based on the total weight of the ethylene/$C_3$–$C_{12}$-α-olefin copolymer, of ethylene; and 4 to 80% by weight, preferably from 15 to 75% by weight, based on the total weight of the ethylene/$C_3$–$C_{12}$-α-olefin copolymer, of $C_3$–$C_{12}$-α-olefin. Examples of suitable $C_3$–$C_{12}$-α-olefins are propene, 1-butene, 1-pentene, 1-hexene, 1-octene, 1-decene, and 1-dodecene. Typical examples of these materials are ethylene-propylene rubber and also LLDPE and VLDPE.

ethylene/$C_3$–$C_{12}$-α-olefin/unconjugated-diene terpolymers containing from 20 to 96% by weight, preferably from 25 to 85% by weight, based on the total weight of ethylene/$C_3$–$C_{12}$-α-olefin/unconjugated-diene terpolymer, of ethylene; 4 to 80% by weight, preferably from 15 to 75% by weight, based on the total weight of the ethylene/$C_3$–$C_{12}$-α-olefin/unconjugated-diene terpolymer, of $C_3$–$C_{12}$-α-olefin; and up to at most about 10% by weight, preferably 1 to 5% by weight, based on the total weight of the ethylene/$C_3$–$C_{12}$-α-olefin/unconjugated-diene terpolymer, of an unconjugated diene, such as bicyclo[2.2.1]-heptadiene, 1,4-hexadiene, dicyclopentadiene, and in particular 5-ethylidenenorbornene. Examples of suitable $C_3$–$C_{12}$-α-olefins are again propene, 1-butene, 1-pentene, 1-hexene, 1-octene, 1-decene, and 1-dodecene.

The preparation of these copolymers or terpolymers with the aid of a Ziegler-Natta catalyst is known.

The styrene-ethylene/butene block copolymers preferably used are styrene-ethylene/butylene-styrene block copolymers (SEBS), which are obtainable by hydrogenating styrene-butadiene-styrene block copolymers. However, it is also possible to use diblock systems (SEB) or multiblock systems. Block copolymers of this type are also known.

Component (II) contains anhydride groups which may be introduced in a known manner by thermal or free-radical reaction of the main chain polymer with an unsaturated dicarboxylic anhydride, with an unsaturated dicarboxylic acid, or with an unsaturated monoalkyl dicarboxylate, at a concentration sufficient for good bonding to the polyamide. Examples of suitable reagents are maleic acid, maleic anhydride, monobutyl maleate, fumaric acid, aconitic acid, and itaconic anhydride. Using this method, it is preferable for from 0.1 to 4% by weight, based on the weight of component (II), of an unsaturated anhydride to have been grafted onto impact-modifying component II. As is known, it is also possible for another unsaturated monomer, such as styrene, α-methylstyrene or indene, to be grafted on together with the unsaturated dicarboxylic anhydride or its precursor. In a preferred embodiment component (II) has a melt flow rate (MFR) according to ASTM D 1238 in the range from about 0,1 g/10 min to about 25 g/10 min at 230° C. under a load of 2,16 kg.

Examples of monomers used in the makeup of the copolymer of component (III) are as follows, this list not being comprehensive:

(a) α-olefins, such as ethylene, propene, 1-butene, 1-pentene, 1-hexene, 1-octene, 1-decene, and 1-dodecene, for example;
  (b) acrylic acid, methacrylic acid or salts thereof, for example with $Na^+$ or $Zn^{2+}$ as counterion; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylonitrile, acrylamide, N-methylacrylamide, N,N-dimethylacrylamide, N-ethyl-acrylamide, N-hydroxyethylacrylamide, N-propylacrylamide, N-butylacrylamide, N-(2-ethylhexyl)acrylamide, methacrylamide, N-methylmethacrylamide, N,N-dimethylacrylamide, N-ethylmethacrylamide, N-hydroxyethylmethacrylamide, N-propylmethacrylamide, N-butylmethacrylamide, N,N-dibutylmethacrylamide, N-(2-ethylhexyl)methacrylamide;

(c) vinyloxirane, allyloxirane, glycidyl acrylate, glycidyl methacrylate, maleic anhydride, aconitic anhydride, itaconic anhydride, and also the dicarboxylic acids arising from these anhydrides by reaction with water; maleimide, N-methyl maleimide, N-ethylmaleimide, N-butylmaleimide, N-phenylmaleimide, aconitimide, N-methyl aconitimide, N-phenylaconitimide, itaconimide, N-methylitaconimide, N-phenylitaconimide, N-acryloylcaprolactam, N-methacryloylcaprolactam, N-acryloyllaurolactam, N-methacryloyllaurolactam, vinyloxazoline, isopropenyloxazoline, allyloxazoline, vinyloxazinone or isopropenyloxazinone.

If use is made of glycidyl acrylate or of glycidyl methacrylate, these function at the same time as acrylic compound b), and therefore if the amount of the glycidyl (meth)acrylate is sufficient there is no need for any other acrylic compound to be present. In this specific embodiment, the copolymer contains units of the following monomers:

(a') from 20 to 94.5% by weight, based on the total weight of (a'), (b'), and (c'), of one or more α-olefins having from 2 to 12 carbon atoms, (b') from 0 to 79.5% by weight, based on the total weight of (a'), (b'), and (c'), of one or more acrylic compounds, selected from the group consisting of
acrylic acid and methacrylic acid and salts thereof,
esters of acrylic acid and/or of methacrylic acid with a $C_1$–$C_{12}$ alcohol,
acrylonitrile and methacrylonitrile,
acrylamides and methacrylamides, and (c') from 0.5 to 80% by weight, based on the total weight of (a'), (b'), and (c'), of an ester of acrylic acid or methacrylic acid, where the ester contains an epoxy group, where the total of (b') and (c') is at least 5.5% by weight.

The copolymer of component (III) may contain a small amount of other copolymerized monomers, such as dimethyl maleate, dibutyl fumarate, diethyl itaconate or styrene, as long as these do not significantly adversely affect the properties.

The preparation of copolymers of this type is known. A wide variety of types is available commercially, for example as LOTADER® (Elf Atochem; ethylene/acrylate/tercomponent or ethylene/glycidyl methacrylate).

In a preferred embodiment component (III) has a melt flow rate (MFR) according to ASTM D 1238 in the range from about 0,1 g/10 min to about 25 g/10 min at 190° C. under a load of 325 g.

The polyamide of component (I) has an excess of amino end groups, the excess generally stemming from the use of a diamine as molecular-weight regulator during preparation of the polyamide. The excess of amino end groups may also be achieved by mixing a polyamide low in amino groups and a polyamide high in amino groups. The mole ratio of amino end groups to carboxyl end groups is to be at least 51:49, preferably at least 55:45, particularly preferably at least 60:40 and in particular preferably at least 70:30.

In one advantageous embodiment, some of the polyamide of component (I) is in the form of polyamine-polyamide copolymer, specifically from 0.1 to 10 parts by weight, preferably from 0.2 to 5 parts by weight, and particularly preferably from 0.25 to 3 parts by weight. The polyamine-polyamide copolymer may be prepared using the following monomers:

(a") from 0.5 to 25% by weight, preferably from 1 to 20% by weight, and particularly preferably from 1.5 to 16% by weight, based on the weight of the polyamine-polyamide copolymer, of a polyamine having at least 4 nitrogen atoms, preferably at least 8 nitrogen atoms, and particularly preferably at least 11 nitrogen atoms and a number-average molar mass Mn of at least 146 g/mol, preferably at least 500 g/mol, and particularly preferably at least 800 g/mol, and (b") polyamide-forming monomers selected from the group consisting of lactams, ω-aminocarboxylic acids and/or equimolar combinations of diamine and dicarboxylic acid.

In one preferred embodiment, the amino group concentration in the polyamine-polyamide copolymer is in the range from 100 to 2500 mmol/kg.

Examples of classes of substances which may be used as the polyamine are the following:

polyvinylamines (see: *Römpp Chemie Lexikon* [*Römpp's Chemical Encyclopedia*], 9th edition, Vol. 6, p. 4921, Georg Thieme Verlag Stuttgart, 1992, which is incorporated herein by reference);

polyamines which are prepared from alternating polyketones (see: DE-A 196 54 058, which is incorporated herein by reference);

dendrimers, such as
$((H_2N—(CH_2)_3)_2N—(CH_2)_3)_2—N(CH_2)_2—N((CH_2)_2—N((CH_2)_3—NH_2)_2)_2$(DE-A196 54 179) or tris(2-aminoethyl)amine, N,N-bis(2-aminoethyl)-N',N'-bis[2-[bis(2-aminoethyl)amino]ethyl]-1,2-ethanediamine, 3,15-bis(2-aminoethyl)-6,12-bis[2-aminoethyl)amino]ethyl]-9-[2-[bis[2-bis(aminoethyl)-amino]ethyl]amino]ethyl]-3,6,12,15,-pentaaza-heptadecane-1,17 diamine (see: J. M. Warakomski, *Chem. Mat.*, 1992, 4, 1000–1004, which is incorporated herein by reference);

linear polyethyleneimines, which can be prepared by polymerizing 4,5-dihydro-1,3-oxazoles, followed by hydrolysis (see: Houben-Weyl, *Methoden der Organischen Chemie* [*Methods in Organic Chemistry*], Vol. E20, pp. 1482–1487, Georg Thieme Verlag Stuttgart, 1987, which is incorporated herein by reference);

branched polyethyleneimines, which can be obtained by polymerizing aziridines (see: Houben-Weyl, *Methoden der Organischen Chemie* [*Methods in Organic Chemistry*], Vol. E20, pp. 1482–1487, Georg Thieme Verlag Stuttgart, 1987, which is incorporated herein by reference) and generally have the following distribution of amino groups:
from 25 to 46 mol % of primary amino groups,
from 30 to 45 mol % of secondary amino groups, and
from 16 to 40 mol % of tertiary amino groups.

In the preferred case, the polyamine has a number-average molar mass $M_n$ of not more than 20,000 g/mol, particularly preferably not more than 10,000 g/mol, and more particularly preferably not more than 5,000 g/mol.

Lactams or ω-aminocarboxylic acids which are used as polyamide-forming monomers contain from 4 to 19 carbon atoms, in particular from 6 to 12 carbon atoms. It is particularly preferable to use ε-caprolactam, ε-aminocaproic acid, caprylolactam, ω-aminocaprylic acid, laurolactam, ω-aminododecanoic acid and/or ω-aminoundecanoic acid.

Examples of combinations of diamine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylenediamine/2,6-naphthalenedicarboxylic acid. However, besides these it is also possible to use any other combinations, such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam, or dodecamethylenediamine/2,6-naphthalenedicarboxylic acid/laurolactam.

In one preferred embodiment, the polyamine-polyamide copolymer is prepared with the additional use of an oligocarboxylic acid which has been selected from the class consisting of from 0.015 to about 3 mol % of dicarboxylic acid and from 0.01 to about 1.2 mol % of tricarboxylic acid, based in each case on the total of the other polyamide-forming monomers. In the calculation of these proportions, when considering the combination of equivalents of diamine and dicarboxylic acid, each of these individual monomers is included. If use is made of a dicarboxylic acid, it is preferable to add from 0.03 to 2.2 mol %, particularly preferably from 0.05 to 1.5 mol %, very particularly preferably from 0.1 to 1 mol % and in particular from 0.15 to 0.65 mol %. If use is made of a tricarboxylic acid, it is preferable to use from 0.02 to 0.9 mol %, particularly preferably from 0.025 to 0.6 mol %, very particularly preferably from 0.03 to 0.4 mold, and in particular from 0.04 to 0.25 mol %. The concomitant use of the oligocarboxylic acid markedly improves resistance to solvents and to fuels, in particular resistance to hydrolysis and alcoholysis.

The oligocarboxylic acid used may comprise any desired di- or tricarboxylic acid having from 6 to 24 carbon atoms, such as adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

If desired, use may also be made of aliphatic, alicyclic, aromatic, aralkyl, and/or alkylaryl-substituted monocarboxylic acids having from 3 to 50 carbon atoms, e.g. lauric acid, unsaturated fatty acids, acrylic acid or benzoic acid, as a regulator. Using these regulators can reduce the concentration of amino groups without altering the structure of the molecule. This method can also be used to introduce functional groups, such as double bonds or triple bonds, etc. However, it is desirable for the polyamine-polyamide copolymer to have a substantial proportion of amino groups. The amino group concentration in this copolymer is preferably in the range from 150 to 1500 mmol/kg, particularly preferably in the range from 250 to 1300 mmol/kg and very particularly preferably in the range from 300 to 1100 mmol/kg. For the purposes of the present invention, amino groups here and below are not only amino end groups but also any secondary or tertiary amine functions which may be present in the polyamine.

The polyamine-polyamide copolymers of the invention may be prepared by various processes.

One method involves bringing the lactam and, respectively, ω-aminocarboxylic acid and polyamine together and then carrying out the polymerization or the polycondensation. The oligocarboxylic acid may be added either at the start or during the course of the reaction.

However, one preferred method is a two-stage process in which the lactam cleavage and prepolymerization is first carried out in the presence of water (as an alternative, the appropriate ω-aminocarboxylic acids and, respectively, diamines and dicarboxylic acids are used directly and prepolymerized). In the second step, the polyamine is added, while any oligocarboxylic acid used concomitantly is metered in prior to, during, or after the prepolymerization. The pressure is then released at temperatures between 200 and 290° C., and polycondensation takes place in a stream of nitrogen or in vacua.

Another preferred method involves the hydrolytic degradation of a polyamide to give a prepolymer, and simultaneous or subsequent reaction with the polyamine. It is preferable to use polyamides in which the end-group difference is approximately zero, or in which any oligocarboxylic acid used concomitantly has previously been incorporated by polycondensation. However, the oligocarboxylic acid may also be added at the start of, or in the course of, the degradation reaction.

By using these methods, it is possible to prepare ultra-high-branched polyamides with acid values below 40 mmol/kg, preferably below 20 mmol/kg, and particularly preferably below 10 mmol/kg. Almost complete conversion is achieved after as little as from one to five hours of reaction time at temperatures of from 200 to 290° C.

If desired, a vacuum stage lasting a number of hours may follow, as another process step. This lasts for at least four hours, preferably for at least six hours, and particularly preferably for at least eight hours, at from 200 to 290° C. After an induction period of a number of hours, the melt viscosity is then observed to increase, probably due to a reaction of amino end groups with one another, with elimination of ammonia and chain-linkage. This further increases the molar mass, and this is particularly advantageous for molding compositions intended for extrusion.

If there is a desire not to complete the reaction in the melt, solid-phase postcondensation of the polyamine-polyamide copolymer as known is also possible.

With the aid of the polyamine-polyamide copolymer, the ratio of amino end groups to carboxyl end groups in component I can be controlled. The result is a still further improvement in interaction between component (I) on the one hand and components (II) and (III) on the other, giving a still further improvement in low-temperature impact strength. At the same time, adding this copolymer also lowers the melt viscosity, and molding compositions of this type are therefore easier to process. This finding is surprising, since there is generally an inverse correlation between melt viscosity and impact strength.

The present molding compositions may be prepared by simply mixing components (I), (II), and (III) in the desired amounts. The mixing may be carried out using any conventional mixing apparatus, such as a drum mixer.

Besides constituents (I) to (III), the molding composition may also comprise relatively small amounts of additives which are added to achieve certain properties. Examples of these are plasticizers; pigments or fillers, such as carbon black, titanium dioxide, zinc sulfide, silicates or carbonates; processing aids, such as waxes, zinc stearate or calcium stearate; flame retardants, such as magnesium hydroxide, aluminum hydroxide, or melamine cyanurate; glass fibers; antioxidants; UV stabilizers; and also additives which give the product antistatic properties or electrical conductivity, e.g., carbon fibers, graphite fibrils, stainless steel fibers, or conductivity black.

In one preferred embodiment, the molding composition comprises from 1 to 25% by weight, particularly preferably from 2 to 20% by weight, and more particularly preferably from 3 to 15% by weight, based on the total weight of the molding composition, of plasticizer.

Plasticizers and their use in polyamides are known. A general overview of plasticizers suitable for polyamides can be found in Gächter/Müller, *Kunststoffadditive [Plastics Additives]*, C. Hanser Verlag, 2nd edition, p. 296, which is incorporated herein by reference.

Examples of the usual compounds suitable as plasticizers are esters of p-hydroxybenzoic acid having from 2 to 20 carbon atoms in the alcohol component, or amides of arylsulfonic acids having from 2 to 12 carbon atoms in the amine component, preferably amides of benzenesulfonic acid.

Examples of plasticizers which may be used are ethyl p-hydroxybenzoate, octyl p-hydroxybenzoate, isohexadecyl p-hydroxybenzoate, N-n-octyltoluenesulfonamide, N-n-butylbenzenesulfonamide, or N-2-ethylhexylbenzenesulfonamide.

The molding compositions of the present invention may be used for producing moldings, e.g. for mechanical engineering, or for sports products, in particular for producing engineering components in the automotive industry sector. These are generally tubes, filler necks or containers, in particular for conducting or storing liquids or gases. A tube of this type may have a straight-line or corrugated shape, or may have corrugations only in some of its sections. Corrugated tubes are known (see, e.g., U.S. Pat. No. 5,460,771, which is incorporated herein by reference) and further remarks concerning this topic are therefore unnecessary. Important applications are use as a fuel line, as a tank-filling pipe, as a vapor line (i.e. a line which conducts fuel vapors, e.g. a ventilation line), as a coolant-fluid line, as an air-conditioning-system line, or as a fuel tank. The molding composition is also advantageously used for quick connectors, pump housings, fuel-filter housings, activated-carbon canisters, valve housings, anti-surge cups, connectors to plastic fuel tanks, tank filler necks, cable coatings for electrical cables, housings for hydraulic cylinders, windshield-wash system lines, clutch lines, reduced-pressure lines, ventilation lines, hydraulic lines, or air-brake lines.

The molding composition of the present invention is also used for producing fuel-pump lines or for producing water-supply lines.

All of these moldings may either be composed entirely of the molding composition of the present invention or may comprise the molding composition of the present invention as one of two or more layers, for example as a reinforcing outer layer or as an inner layer, for example in a tube having two or more layers or container having two or more layers.

The moldings of the present invention may be produced by any conventional method, for example by extrusion, coextrusion, blow molding or injection molding.

Other features of the invention will become apparent in the course of the following descriptions of exemplary embodiments which are given for illustration of the invention and are not intended to be limiting thereof.

EXAMPLES

In the following examples, and throughout this specification, all parts and percentages are by weight, and all temperatures are in degrees Celsius, unless expressly stated to be otherwise.

The following materials were used in the experiments:

PA1: a commercially available nylon-6,12 with an excess of carboxyl end groups (acid value: 60 mmol/kg; amino end group concentration: 11 mmol/kg); $\eta_{rel}$=2.2; VESTAMID® D22 from DEGUSSA-HÜLS AG PA2: a nylon-6,12 with an excess of amino end groups (acid value: 27 mmol/kg; amino end group concentration: 48 mmol/kg); $\eta_{rel}$=2.2

EXXELOR® VA 1803: a maleic-anhydride-grafted ethylene/propylene rubber as impact-modifying component (EXXON Chemicals)

LOTADER® AX 8900: a random terpolymer made from ethylene, about 32% by weight of acrylates and about 7–9% by weight of glycidyl methacrylate from ATOFINA BBSA: N-butylbenzenesulfonamide (plasticizer)

Comparative Example 1

100 parts by weight of PA1, 10 parts by weight of BBSA, 10 parts by weight of EXXELOR® VA 1803, and 1 part by weight of LOTADER® AX 8900 were mixed in the melt, extruded and pelletized using a Berstorff ZE 25 33D twin-screw kneader, at 250° C. and 200 rpm, with a throughput of 10 kg/h. The pellets were then used to produce extruded monotubes of dimensions 8×1 mm (i.e. 8 mm external diameter and 1 mm wall thickness). The impact test results are given in table 1.

Example 1

100 parts by weight of PA2, 10 parts by weight of BBSA, 10 parts by weight of EXXELOR® VA 1803, and 1 part by weight of LOTADER® AX 8900 were mixed and further processed using a Berstorff ZE 25 33D twin-screw kneader as in Comparative Example 1. The impact test results are given in table 1.

Comparative Example 2

As example 1, but without LOTADER® AX 8900; again, the impact test results are given in table 1.

TABLE 1

Impact strength at −40° C., measured on tubes of dimensions 8 × 1 mm

| Standard | Fracture ratio: number of fractures per 10 tubes tested | | |
|---|---|---|---|
| | Comparative Example 1 | Example 1 | Comparative Example 2 |
| SAE J844 (impact weight 455 g) | 2 | 0 | 1 |
| SAE J 2260 (impact weight 912 g) | 0 | 0 | 0 |
| VW/Audi (impact weight 500 g) | 5 | 0 | 6 |
| DIN 73378 | 0 | 0 | 0 |

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed is:

1. A molding composition, consisting of:
   (I) from 60 to 96.5 parts by weight of a polyamide;
   (II) from 3 to 39.5 parts by weight of an impact-modifying component which comprises anhydride groups, wherein said impact-modifying component is selected from the group consisting of ethylene/$C_3$–$C_{12}$-α-olefin copolymers and styrene-ethylene/butylene block copolymers;

(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms;
(b) from 5 to 79.5% by weight, based on the total weight of (a), (b), and (c), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c) from 0.5 to 50% by weight, based on the total weight of (a), (b), and (c), of an olefinically unsaturated epoxide, an olefinically unsaturated carboxylic anhydride, an olefinically unsaturated carboximide, an olefinically unsaturated oxazoline, or an olefinically unsaturated oxazinone;
wherein the total of the parts by weight of components I, II, and III is 100;
wherein said polyamide has more amino end groups than carboxyl end groups; and
wherein a mole ratio of said amino end groups to said carboxyl end groups is at least 55:45.

2. The molding composition of claim 1, wherein the polyamide is selected from the group consisting of nylon-4,6; nylon-6,6; nylon-6,8; nylon-6,10; nylon-6,12; nylon-4,10; nylon-8,10; nylon-10,10; nylon-4,12; nylon-10,12; nylon-12,12; nylon-6; nylon-7; nylon-8; nylon-9; nylon-10; nylon-11; and nylon-12.

3. The molding composition of claim 1, wherein said polyamide (I) comprises from 0.1 to 10 parts by weight, based on 100 parts by weight of said polyamide (I), of a polyamine-polyamide copolymer which comprises the following monomer units:
(a") from 0.5 to 25% by weight, based on the total weight of said polyamine-polyamide copolymer, of a polyamine having at least 4 nitrogen atoms and a number-average molar mass $M_n$ of at least 146 g/mol; and
(b") polyamide-forming monomers selected from the group consisting of lactams, ω-aminocarboxylic acids and/or equimolar combinations of diamine and dicarboxylic acid.

4. The molding composition of claim 1, wherein said mole ratio of said amino end groups to said carboxyl end groups is at least 60:40 in said polyamide.

5. The molding composition of claim 1, wherein said mole ratio of said amino end groups to said carboxyl end groups is at least 70:30 in said polyamide.

6. A molding composition, consisting of:
(I) from 60 to 96.5 parts by weight of a polyamide;
(II) from 3 to 39.5 parts by weight of an impact-modifying component which comprises anhydride groups, wherein said impact-modifying component is selected from the group consisting of ethylene/$C_3$–$C_{12}$-α-olefin copolymers and styrene-ethylene/butylene block copolymers;
(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms;
(b) from 5 to 79.5% by weight, based on the total weight of (a), (b), and (c), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c) from 0.5 to 50% by weight, based on the total weight of (a), (b), and (c), of an olefinically unsaturated epoxide, an olefinically unsaturated carboxylic anhydride, an olefinically unsaturated carboximide, an olefinically unsaturated oxazoline, or an olefinically unsaturated oxazinone;
wherein the total of the parts by weight of components I, II, and III is 100;
(IV) from 1 to 25% by weight of a plasticizer, based on the total weight of said molding composition;
wherein said polyamide has more amino end groups than carboxyl end groups; and
wherein a mole ratio of said amino end groups to said carboxyl end groups is at least 55:45.

7. A molding composition, consisting of:
(I) from 60 to 96.5 parts by weight of a polyamide;
(II) from 3 to 39.5 parts by weight of an impact-modifying component which comprises anhydride groups, wherein said impact-modifying component is selected from the group consisting of ethylene/$C_3$–$C_{12}$-α-olefin copolymers and styrene-ethylene/butylene block copolymers;
(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms;
(b) from 5 to 79.5% by weight, based on the total weight of (a), (b), and (c), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c) from 0.5 to 50% by weight, based on the total weight of (a), (b), and (c), of an olefinically unsaturated epoxide, an olefinically unsaturated carboxylic anhydride, an olefinically unsaturated carboximide, an olefinically unsaturated oxazoline, or an olefinically unsaturated oxazinone;
wherein the total of the parts by weight of components I, II, and III is 100;
wherein said polyamide has more amino end groups than carboxyl end groups; and
wherein a mole ratio of said amino end groups to said carboxyl end groups is at least 55:45;
wherein said molding composition has been rendered antistatic and/or electrically conductive.

8. A molding composition, consisting of:
(I) from 60 to 96.5 parts by weight of a polyamide;
(II) from 3 to 39.5 parts by weight of an impact-modifying component which comprises anhydride groups, wherein said impact-modifying component is selected from the group consisting of ethylene/$C_3$–$C_{12}$-α-olefin copolymers and styrene-ethylene/butylene block copolymers;

(III) from 0.5 to 20 parts by weight of a copolymer which comprises monomer units of the following monomers:
(a') from 20 to 94.5% by weight, based on the total weight of (a'), (b'), and (c'), of one or more α-olefins having from 2 to 12 carbon atoms,
(b') from 0 to 79.5% by weight, based on the total weight of (a'), (b'), and (c'), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c') from 0.5 to 80% by weight, based on the total weight of (a'), (b'), and (c'), of an ester of acrylic acid or methacrylic acid, wherein said ester contains an epoxy group, and
wherein the total amount of (b') and (c') is at least 5.5% by weight, based on the total weight of (a'), (b'), and (c'),
wherein the total of the parts by weight of components I, II, and III is 100;
wherein said polyamide has more amino end groups than carboxyl end groups; and
wherein a mole ratio of said amino end groups to said carboxyl end groups is at least 55:45.

9. The molding composition of claim 8, said mole ratio of said amino end groups to said carboxyl end groups is at least 60:40 in said polyamide.

10. The molding composition of claim 8, wherein said mole ratio of said amino end groups to said carboxyl end groups is at least 70:30 in said polyamide.

11. A molding, produced from a molding composition, said molding composition consisting of:

(I) from 60 to 96.5 parts by weight of a polyamide;
(II) from 3 to 39.5 parts by weight of an impact-modifying component which comprises anhydride groups, wherein said impact-modifying component is selected from the group consisting of ethylene/$C_3$–$C_{12}$-α-olefin copolymers and styrene-ethylene/butylene block copolymers;
(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms;
(b) from 5 to 79.5% by weight, based on the total weight of (a), (b), and (c), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c) from 0.5 to 50% by weight, based on the total weight of (a), (b), and (c), of an olefinically unsaturated epoxide, an olefinically unsaturated carboxylic anhydride, an olefinically unsaturated carboximide, an olefinically unsaturated oxazoline, or an olefinically unsaturated oxazinone,
wherein the total of the parts by weight of components I, II, and III is 100;
wherein said polyamide has more amino end groups than carboxyl end groups; and
wherein a mole ratio of said amino end groups to said carboxyl end groups is at least 55:45.

12. The molding of claim 11, which is an engineering component in the automotive industry sector.

13. The molding of claim 11, which is a tube, a filler neck or a container.

14. The molding of claim 11, which is a fuel line, a tank-filling pipe, a vapor line, a fuel-pump line, a coolant-liquid line, an air-conditioning-system line, a fuel container, a quick connector, a pump housing, a fuel-filter housing, an activated-carbon canister, a valve housing, an anti-surge cup, a connector to a plastic fuel tank, a tank filler neck, a cable coating for an electrical cable, a housing for a hydraulic cylinder, a windshield-wash-system line, a clutch line, a reduced-pressure line, a ventilation line, a hydraulic line, an air-brake line or a water-supply line.

15. The molding of claim 11, which comprises said molding composition as one of two or more layers.

16. The molding of claim 11, which is a tube having two or more layers.

17. The molding of claim 11, produced by extrusion, coextrusion, blow molding or injection molding.

18. The molding of claim 11, wherein said mole ratio of said amino end groups to said carboxyl end groups is at least 60:40 in said polyamide.

19. The molding of claim 11, wherein said mole ratio of said amino end groups to said carboxyl end groups is at least 70:30 in said polyamide.

20. A molding, produced from a molding composition, said molding composition consisting of:

(I) from 60 to 96.5 parts by weight of a polyamide;
(II) from 3 to 39.5 parts by weight of an impact-modifying component which comprises anhydride groups, wherein said impact-modifying component is selected from the group consisting of ethylene/$C_3$–$C_{12}$-α-olefin copolymers and styrene-ethylene/butylene block copolymers;
(III) from 0.5 to 20 parts by weight of a copolymer which comprises monomer units of the following monomers:
(a') from 20 to 94.5% by weight, based on the total weight of (a'), (b'), and (c'), of one or more α-olefins having from 2 to 12 carbon atoms,
(b') from 0 to 79.5% by weight, based on the total weight of (a'), (b'), and (c'), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c') from 0.5 to 80% by weight, based on the total weight of (a'), (b'), and (c'), of an ester of acrylic acid or methacrylic acid, wherein said ester contains an epoxy group, and
wherein the total amount of (b') and (c') is at least 5.5% by weight, based on the total weight of (a'), (b'), and (c'),
wherein the total of the parts by weight of components I, II, and III is 100;
wherein said polyamide has more amino end groups than carboxyl end groups; and
wherein a mole ratio of said amino end groups to said carboxyl end groups is at least 55:45.

21. The molding of claim 20, which is a tube, a filler neck or a container.

15

22. The molding of claim 20, which is a fuel line, a tank-filling pipe, a vapor line, a fuel-pump line, a coolant-liquid line, an air-conditioning-system line, a fuel container, a quick connector, a pump housing, a fuel-filter housing, an activated-carbon canister, a valve housing, an anti-surge cup, a connector to a plastic fuel tank, a tank filler neck, a cable coating for an electrical cable, a housing for a hydraulic cylinder, a windshield-wash-system line, a clutch line, a reduced-pressure line, a ventilation line, a hydraulic line, an air-brake line or a water-supply line.

23. The molding of claim 20, wherein said mole ratio of said amino end groups to said carboxyl end groups is at least 60:40 in said polyamide.

24. The molding of claim 20, wherein said mole ratio of said amino end groups to said carboxyl end groups is at least 70:30 in said polyamide.

25. A molding composition, which comprises:
(I) from 60 to 96.5 parts by weight of a polyamide;
(II) from 3 to 39.5 parts by weight of an impact-modifying component which comprises anhydride groups, wherein said impact-modifying component is an ethylene/$C_3$–$C_{12}$-α-olefin copolymer;
(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms;
(b) from 5 to 79.5% by weight, based on the total weight of (a), (b), and (c), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c) from 0.5 to 50% by weight, based on the total weight of (a), (b), and (c), of an olefinically unsaturated epoxide, an olefinically unsaturated carboxylic anhydride, an olefinically unsaturated carboximide, an olefinically unsaturated oxazoline, or an olefinically unsaturated oxazinone,
wherein the total of the parts by weight of components I, II, and III is 100;
wherein said polyamide has more amino end groups than carboxyl end groups; and
wherein a mole ratio of said amino end groups to said carboxyl end groups is at least 55:45.

26. The molding composition of claim 23, wherein the polyamide is selected from the group consisting of nylon-4,6; nylon-6,6; nylon-6,8; nylon-6,10; nylon-6,12; nylon-4,10; nylon-8,10; nylon-10,10; nylon-4,12; nylon-10,12; nylon-12,12; nylon-6; nylon-7; nylon-8; nylon-9; nylon-10; nylon-11; and nylon-12.

27. The molding composition of claim 23, wherein said polyamide (I) comprises from 0.1 to 10 parts by weight, based on 100 parts by weight of said polyamide (I), of a polyamine-polyamide copolymer which comprises the following monomer units:
(a") from 0.5 to 25% by weight, based on the total weight of said polyamine-polyamide copolymer, of a polyamine having at least 4 nitrogen atoms and a number-average molar mass $M_n$ of at least 146 g/mol; and
(b") polyamide-forming monomers selected from the group consisting of lactams, ω-aminocarboxylic acids and/or equimolar combinations of diamine and dicarboxylic acid.

16

28. The molding composition of claim 23, which contains from 1 to 25% by weight, based on the total weight of said molding composition, of plasticizer.

29. The molding composition of claim 23, which which has been rendered antistatic and/or electrically conductive.

30. The molding composition of claim 23, wherein said mole ratio of said amino end groups to said carboxyl end groups is at least 60:40 in said polyamide.

31. The molding composition of claim 23, wherein said mole ratio of said amino end groups to said carboxyl end groups is at least 70:30 in said polyamide.

32. A molding composition, which comprises:
(I) from 60 to 96.5 parts by weight of a polyamide;
(II) from 3 to 39.5 parts by weight of an impact-modifying component which comprises anhydride groups, wherein said impact-modifying component is an ethylene/$C_3$–$C_{12}$-α-olefin copolymer;
(III) from 0.5 to 20 parts by weight of a copolymer which comprises monomer units of the following monomers:
(a') from 20 to 94.5% by weight, based on the total weight of (a'), (b'), and (c'), of one or more α-olefins having from 2 to 12 carbon atoms,
(b') from 0 to 79.5% by weight, based on the total weight of (a'), (b'), and (c'), of one or more acrylic compounds, selected from the group consisting of:
(i) acrylic acid and methacrylic acid and salts thereof;
(ii) esters of acrylic acid and/or of methacrylic acid with a $C_1$–$C_{12}$ alcohol;
(iii) acrylonitrile and methacrylonitrile;
(iv) acrylamides and methacrylamides; and
(c') from 0.5 to 80% by weight, based on the total weight of (a'), (b'), and (c'), of an ester of acrylic acid or methacrylic acid, wherein said ester contains an epoxy group, and
wherein the total amount of (b') and (c') is at least 5.5% by weight, based on the total weight of (a'), (b'), and (c'),
wherein the total of the parts by weight of components I, II, and III is 100;
wherein said polyamide has more amino end groups than carboxyl end groups; and
wherein a mole ratio of said amino end groups to said carboxyl end groups is at least 55:45.

33. The molding composition of claim 32, wherein said mole ratio of said amino end groups to said carboxyl end groups is at least 60:40 in said polyamide.

34. The molding composition of claim 32, wherein said mole ratio of said amino end groups to said carboxyl end groups is at least 70:30 in said polyamide.

35. A molding, produced from a molding composition, said molding composition comprising:
(I) from 60 to 96.5 parts by weight of a polyamide;
(II) from 3 to 39.5 parts by weight of an impact-modifying component which comprises anhydride groups, wherein said impact-modifying component is an ethylene/$C_3$–$C_{12}$-α-olefin copolymer;
(III) from 0.5 to 20 parts by weight of a copolymer which comprises monomer units of the following monomers:
(a) from 20 to 94.5% by weight, based on the total weight of (a), (b), and (c), of one or more α-olefins having from 2 to 12 carbon atoms;
(b) from 5 to 79.5% by weight, based on the total weight of (a), (b), and (c), of one or more acrylic compounds, selected from the group consisting of:
(i) acrylic acid and methacrylic acid and salts thereof;

(ii) esters of acrylic acid and/or of methacrylic acid with a $C_1$–$C_{12}$ alcohol;

(iii) acrylonitrile and methacrylonitrile;

(iv) acrylamides and methacrylamides; and (c) from 0.5 to 50% by weight, based on the total weight of (a), (b), and (c), of an olefinically unsaturated epoxide, an olefinically unsaturated carboxylic anhydride, an olefinically unsaturated carboximide, an olefinically unsaturated oxazoline, or an olefinically unsaturated oxazinone, wherein the total of the parts by weight of components I, II, and III is 100;

wherein said polyamide has more amino end groups than carboxyl end groups; and wherein a mole ratio of said amino end groups to said carboxyl end groups is at least 55:45.

36. The molding of claim 35, which is an engineering component in the automotive industry sector.

37. The molding of claim 35, which is a tube, a filler neck or a container.

38. The molding of claim 35, which is a fuel line, a tank-filling pipe, a vapor line, a fuel-pump line, a coolant-liquid line, an air-conditioning-system line, a fuel container, a quick connector, a pump housing, a fuel-filter housing, an activated-carbon canister, a valve housing, an anti-surge cup, a connector to a plastic fuel tank, a tank filler neck, a cable coating for an electrical cable, a housing for a hydraulic cylinder, a windshield-wash-system line, a clutch line, a reduced-pressure line, a ventilation line, a hydraulic line, an air-brake line or a water-supply line.

39. The molding of claim 35, which comprises said molding composition as one of two or more layers.

40. The molding of claim 35, which is a tube having two or more layers.

41. The molding of claim 35, produced by extension, coextrusion, blow molding or injection molding.

42. The molding of claim 35, wherein said mole ratio of said amino end groups to said carboxyl end groups is at least 60:40 in said polyamide.

43. The molding of claim 35, wherein said mole ratio of said amino end groups to said carboxyl end groups is at least 70:30 in said polyamide.

44. A molding, produced from a molding composition, said molding composition comprising:

(I) from 60 to 96.5 parts by weight of a polyamide;

(II) from 3 to 39.5 parts by weight of an impact-modifying component which comprises anhydride groups, wherein said impact-modifying component is an ethylene/$C_3$–$C_{12}$-α-olefin copolymer;

(III) from 0.5 to 20 parts by weight of a copolymer which comprises monomer units of the following monomers:

(a') from 20 to 94.5% by weight, based on the total weight of (a'), (b'), and (c'), of one or more α-olefins having from 2 to 12 carbon atoms, (b') from 0 to 79.5% by weight, based on the total weight of (a'), (b'), and (c'), of one or more acrylic compounds, selected from the group consisting of:

(i) acrylic acid and methacrylic acid and salts thereof;

(ii) esters of acrylic acid and/or of methacrylic acid with a $C_1$–$C_{12}$ alcohol;

(iii) acrylonitrile and methacrylonitrile;

(iv) acrylamides and methacrylamides; and (c') from 0.5 to 80% by weight, based on the total weight of (a'), (b'), and (c'), of an ester of acrylic acid or methacrylic acid, wherein said ester contains an epoxy group, and wherein the total amount of (b') and (c') is at least 5.5% by weight, based on the total weight of (a'), (b'), and (c'), wherein the total of the parts by weight of components I, II, and III is 100;

wherein said polyamide has more amino end groups than carboxyl end groups; and wherein a mole ratio of said amino end groups to said carboxyl end groups is at least 55:45.

45. The molding of claim 44, which is a tube, a filler neck or a container.

46. The molding of claim 44, which is a fuel line, a tank-filling pipe, a vapor line, a fuel-pump line, a coolant-liquid line, an air-conditioning-system line, a fuel container, a quick connector, a pump housing, a fuel-filter housing, an activated-carbon canister, a valve housing, an anti-surge cup, a connector to a plastic fuel tank, a tank filler neck, a cable coating for an electrical cable, a housing for a hydraulic cylinder, a windshield-wash-system line, a clutch line, a reduced-pressure line, a ventilation line, a hydraulic line, an air-brake line or a water-supply line.

47. The molding of claim 44, wherein said mole ratio of said amino end groups to said carboxyl end groups is at least 60:40 in said polyamide.

48. The molding of claim 44, wherein said mole ratio of said amino end groups to said carboxyl end groups is at least 70:30 in said polyamide.

* * * * *